United States Patent
Schweitzer et al.

(10) Patent No.: US 10,668,865 B2
(45) Date of Patent: Jun. 2, 2020

(54) ROOF RACK SYSTEM

(71) Applicant: Talem Capital, LLC, Tampa, FL (US)

(72) Inventors: Todd J. Schweitzer, Tampa, FL (US); Greg Bastien, Potomac, MD (US)

(73) Assignee: Talem Capital, LLC, Tampa, FL (US)

( * ) Notice: Subject to any disclaimer, the term of this patent is extended or adjusted under 35 U.S.C. 154(b) by 0 days.

(21) Appl. No.: 16/269,305

(22) Filed: Feb. 6, 2019

(65) Prior Publication Data
US 2019/0241127 A1     Aug. 8, 2019

Related U.S. Application Data

(60) Provisional application No. 62/626,930, filed on Feb. 6, 2018.

(51) Int. Cl.
*B60R 9/042* (2006.01)
*B60R 9/045* (2006.01)

(52) U.S. Cl.
CPC .............. *B60R 9/045* (2013.01); *B60R 9/042* (2013.01)

(58) Field of Classification Search
CPC ......... B60R 9/042; B60R 9/08; B60P 3/1025; B60P 3/1016
See application file for complete search history.

(56) References Cited

U.S. PATENT DOCUMENTS

| | | | | |
|---|---|---|---|---|
| 4,439,086 A | * | 3/1984 | Thede | B60R 9/08 224/310 |
| 4,446,998 A | * | 5/1984 | Taig | B60R 9/042 224/310 |
| 4,826,387 A | * | 5/1989 | Audet | B60R 9/0423 224/310 |
| 5,154,563 A | * | 10/1992 | Phillips | B60R 9/0426 224/326 |
| 5,360,150 A | * | 11/1994 | Praz | B60R 9/042 224/280 |
| 5,417,358 A | * | 5/1995 | Haselgrove | B60R 9/042 224/310 |
| 5,423,650 A | * | 6/1995 | Zerbst | B60R 9/042 224/310 |
| 5,544,796 A | * | 8/1996 | Dubach | B60R 9/042 224/310 |
| 5,690,259 A | * | 11/1997 | Montani | B60R 9/042 224/310 |
| 5,884,824 A | * | 3/1999 | Spring, Jr. | B60R 9/042 224/309 |
| 6,015,074 A | * | 1/2000 | Snavely | B60R 9/042 224/310 |
| 6,099,231 A | * | 8/2000 | Levi | B60R 9/0423 224/310 |
| 6,158,638 A | * | 12/2000 | Szigeti | B60R 9/042 224/310 |
| 6,179,543 B1 | * | 1/2001 | Adame | B60R 9/0423 224/310 |

(Continued)

OTHER PUBLICATIONS

PCT/US2019/016878.

*Primary Examiner* — Brian D Nash
(74) *Attorney, Agent, or Firm* — Brown Rudnick LLP (57) ABSTRACT

The invention generally relates to a roof rack system including a rotating mechanism allowing roof-mounted objects to be slid off of a vehicle's roof and lowered via rotation to a more accessible height in a controlled or powered manner.

14 Claims, 12 Drawing Sheets

(56) References Cited

U.S. PATENT DOCUMENTS

| | | | |
|---|---|---|---|
| 6,308,874 B1 * | 10/2001 | Kim | B60R 9/042 224/309 |
| 6,428,263 B1 * | 8/2002 | Schellens | B60R 9/042 224/310 |
| 6,520,393 B1 * | 2/2003 | Ferguson | B60R 9/042 224/310 |
| 6,681,970 B2 * | 1/2004 | Byrnes | B60R 9/042 224/310 |
| 6,712,247 B1 * | 3/2004 | Fox | B60R 9/042 224/310 |
| 6,874,835 B1 * | 4/2005 | Silverness | B60P 3/40 224/310 |
| 7,003,849 B2 * | 2/2006 | Cohen | A63C 11/221 16/232 |
| 7,048,490 B2 * | 5/2006 | Henderson | B60R 9/042 224/310 |
| 8,640,933 B1 * | 2/2014 | McCray | B60R 9/042 224/310 |
| 2005/0129490 A1 | 6/2005 | Hutchins | |
| 2006/0280583 A1 | 12/2006 | Settelmayer et al. | |
| 2006/0285954 A1 * | 12/2006 | Neary | B60P 3/1025 414/465 |
| 2007/0175936 A1 | 8/2007 | Goyanko | |
| 2013/0248567 A1 * | 9/2013 | Townsend | B60R 9/042 224/321 |
| 2013/0322997 A1 * | 12/2013 | Ziaylek | B60R 9/0423 414/556 |
| 2014/0205419 A1 | 7/2014 | Svaldi et al. | |
| 2014/0217140 A1 * | 8/2014 | Kramer | B60R 9/042 224/484 |
| 2015/0069101 A1 * | 3/2015 | Presley | B60R 9/042 224/310 |
| 2017/0001551 A1 | 1/2017 | Bristow et al. | |
| 2018/0162288 A1 * | 6/2018 | Sautter | B60R 9/042 |

\* cited by examiner

ROOF RACK SYSTEM

RELATED APPLICATIONS

The present patent application claims the benefit of and priority to U.S. Provisional Patent Application Ser. No. 62/626,930, filed on Feb. 6, 2018. The entirety of which is hereby incorporated by reference.

FIELD OF THE INVENTION

The invention generally relates roof rack systems with cargo lowering capacity.

BACKGROUND

Almost 9 out of every 10 people in the United States plan on taking an extended vacation of four day or more away from home in a given year. For leisure trips in the U.S., about 80% are by car. Finding space in a car for all of the cargo, especially in large families, can be difficult. Although more people are buying large cars, the amount of cargo that people carry has also grown as people increasingly travel with pets, sports equipment, and the numerous electronic devices that have become commonplace in our everyday lives. In some instances, the items people carry simply can't fit in a car. Items such as canoes, kayaks, paddle boards, bicycles, skis, and snowboards may be too large or awkwardly shaped to carry inside most vehicles. With other items, for example a muddy mountain bike, vehicle owners may not wish to carry them inside the vehicle in order to keep the interior free from dirt and grease. A common solution to these challenges is to secure cargo on the roof of a vehicle. Many vehicles come with factory roof rack systems and companies such as Yakima Products Inc. (Beaverton, Oreg.) and the Thule Group (Malmo Municipality, Sweden) offer aftermarket roof rack systems adaptable to most vehicles.

While roof racks can provide much needed additional space for cargo outside of the vehicle, many vehicle roofs are high and roof rack components and the cargo they carry can be heavy. Many popular sport utility vehicles have heights around 6 feet and many roof rack components are installed several inches above the roof height. Installing roof rack components such as roof boxes and loading them can prove a challenge requiring people to strain to lift items above their heads and climb awkwardly on bumpers or door sills. This challenge generally proves bothersome and leads to hesitation to use a roof rack but, in some cases, can even cause to injury or damage to the vehicle.

SUMMARY

The present invention generally relates lowering roof rack systems. Roof rack systems of the invention include support or mounting rails to which a variety of available roof rack accessories may be secured. Compatible roof rack accessories include, for example, bike carriers, roof boxes, snow board, ski, kayak, and paddle board carriers available from companies such as companies such as Yakima Products Inc. (Beaverton, Oreg.) and the Thule Group (Malmo Municipality, Sweden). The mounting rails of the invention are constructed with a portion that is parallel to a support frame which is secured to the roof. The mounting or support rails also comprise an angled portion which runs from one end of the parallel portion to a transversely mounted frame rail. The angled portion is both slideably and rotatably mounted to the frame rail so that, when in a raised position, the mounting rail is above the roof but may be slid off of one side of the roof and then rotated down so that the mounting rails are below and to the side of the vehicle. By bringing the mounting rails and the roof rack accessories and cargo mounted thereto below and to the side of the vehicle roof, access is greatly improved for a user who no longer has to climb awkwardly on top of their vehicle to access their rack. When the user has loaded or is otherwise done accessing the mounting rails, accessories, or cargo, the mounting rails may be rotated to bring the mounting rails back above the roof line and then slid back on top of the roof along the frame rails.

Systems of the invention may be manually operated and may include a removable handle to ease transitions between the raised and lowered positions. Systems may include pneumatic cylinders, hydraulic cylinders, various springs or other means of controlling and assisting in the lowering and raising of the mounting rails. In certain embodiments systems may include powered winches, screw drives, gear boxes or other means of automating the raising and lowering procedures.

DETAILED DESCRIPTION

The invention generally relates roof rack systems that allow roof-mounted loads to be easily accessed from the ground. Mounting rails are fixed to a vehicle's roof while cargo boxes or item-specific mounting systems (e.g, bike, kayak, ski, surfboard, canoe, ladder, or other racks) are slideably and rotatably coupled to the mounting rails. Accordingly, the cargo can be slid off of the roof to the side of a vehicle and then rotated to a lower position relative to the ground. A user can thereby avoid the awkward and sometimes dangerous actions of lifting heavy items above their head to a fixed rack and/or climbing on top of vehicles to access items.

Figure 1:
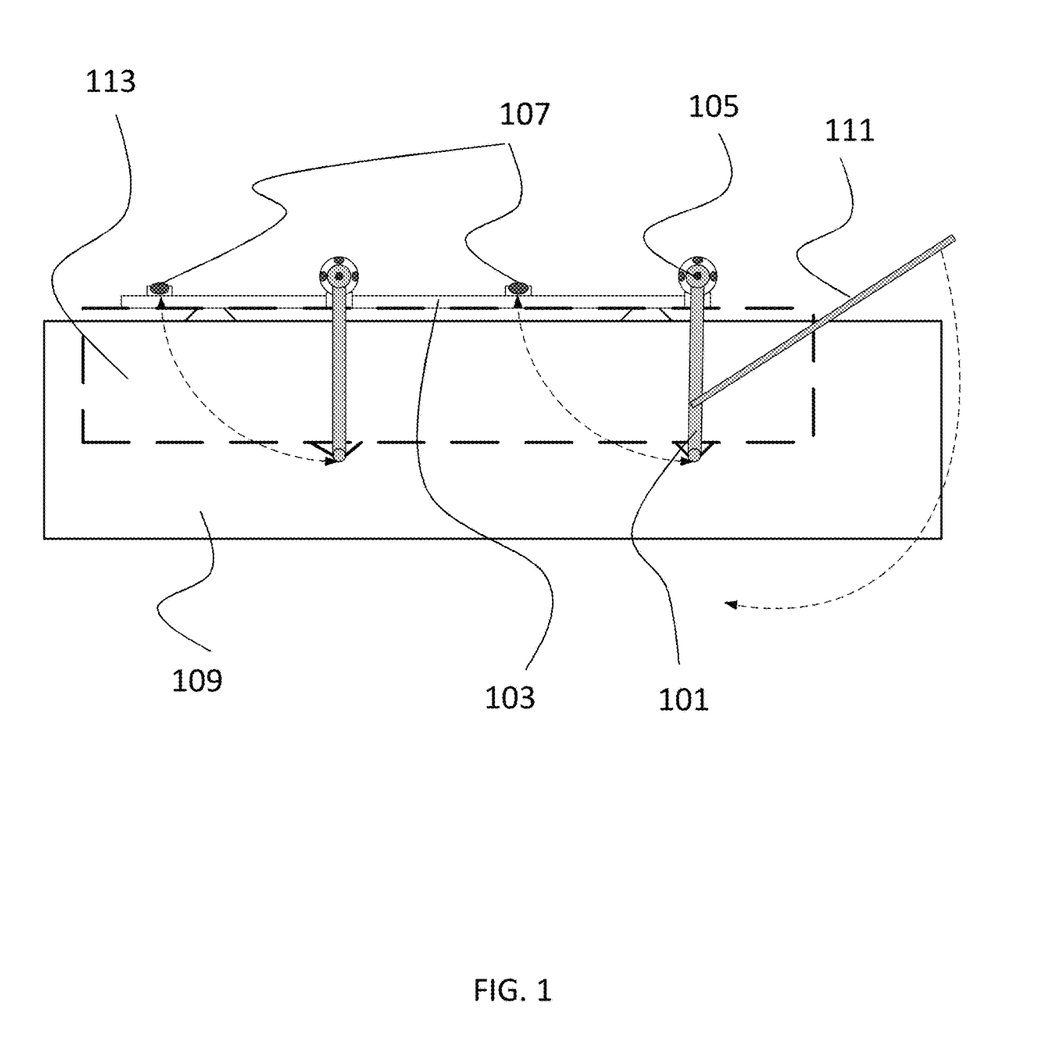
FIG. 1 depicts a side view of a manually operated roof rack system in the lowered position, according to certain embodiments.
Figure 2:
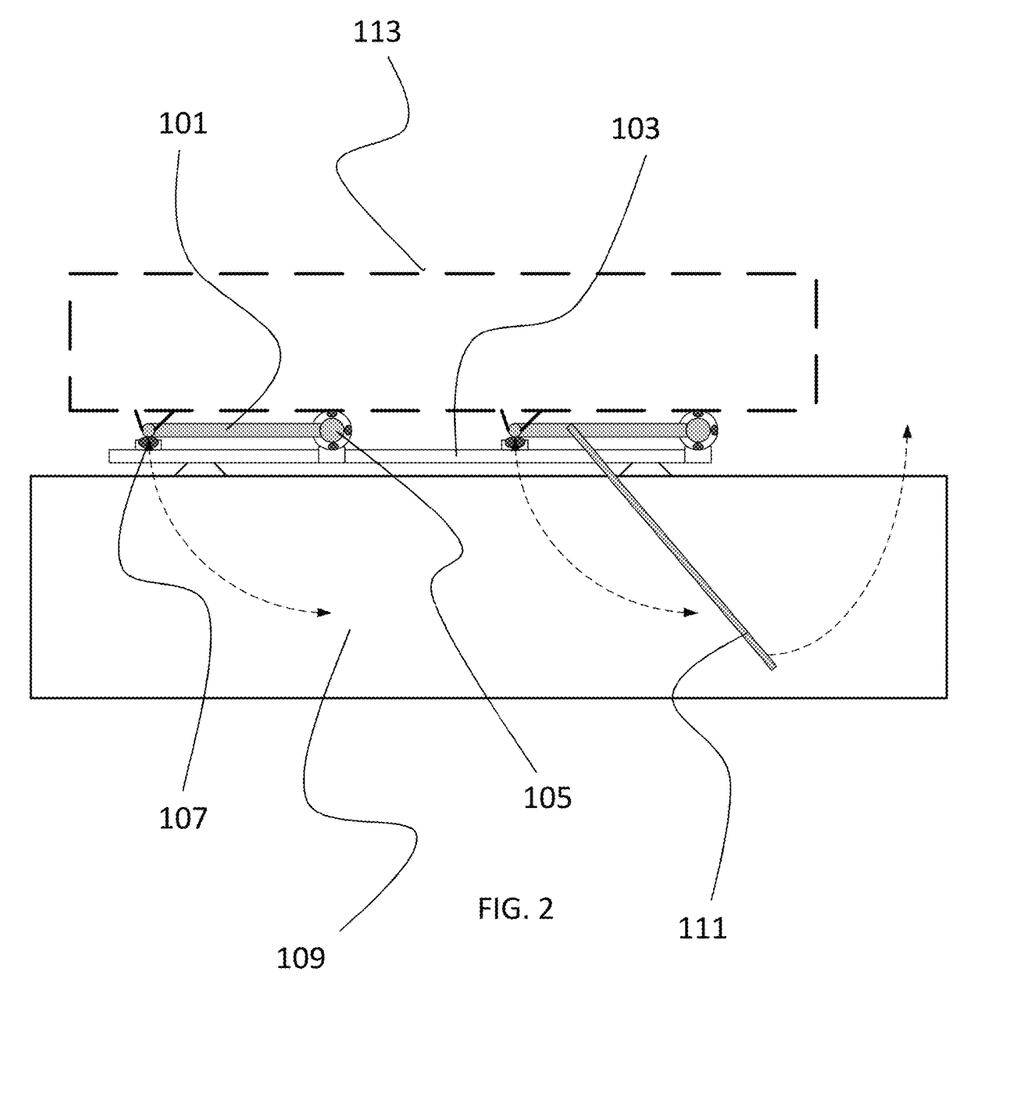
FIG. 2 depicts a side view of a manually operated roof rack system in the raised position, according to certain embodiments.

FIGS. 1-4 show embodiments of a manually operated roof rack system of the invention. FIG. 1 shows a side view of a manually operated roof rack system in the lowered position, to the side of a vehicle 109. The system comprises two mounting rails 101 which are rotatably mounted to a frame 103 at a rotatable coupling 105. Cargo 113, represented as a roof box depicted in broken line, may mount to the mounting rails such that it remains in the same, upright orientation throughout the lowering and raising operations of the roof rack system. The mounting rails 101, and the rotatable coupling 105 are also slideably mounted to the frame 103 using a slideable coupling 107 such that the frame can remain fixed in position, relative to the vehicle 109, while the mounting rails 101 and the cargo 113 mounted thereto may be slid to the side, off of the vehicle roof 109 at which point the cargo 113 and mounting rails may rotate at the rotatable coupling 105 so that the cargo 113 is lowered relative to the ground providing easier access to an individual standing on the ground. A removable handle 111 may be inserted into one or both of the mounting rails 101 in order to provide leverage to a user while raising and lowering the mounting rails 101 and cargo 113. FIG. 2 shows a similar embodiment to FIG. 1 wherein the mounting rails 101 are rotated at the rotatable coupling 105, and slide onto the vehicle 109 roof along the frame 101 at the slideable coupling 107 such that the cargo 113 is above the roof and ready to be secured for travel.

Figure 3:
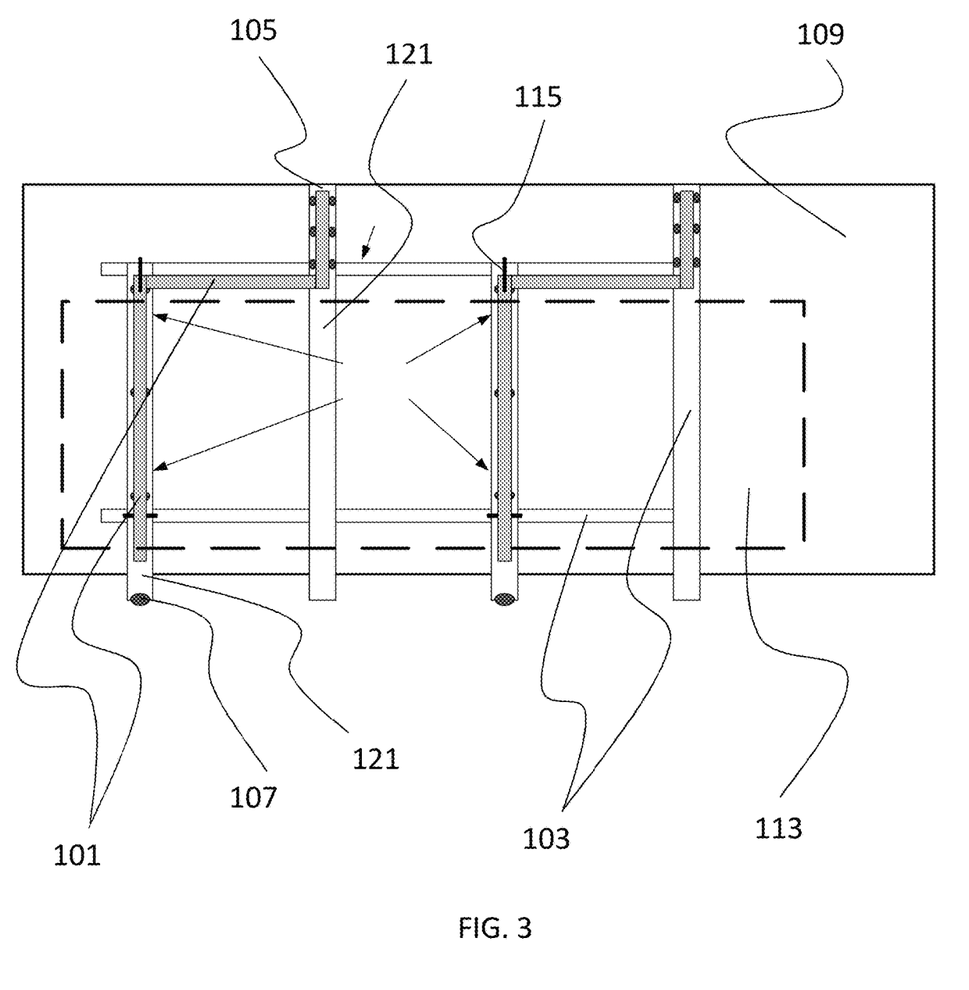
FIG. 3 depicts a top view of a manually operated roof rack system in the raised position, according to certain embodiments.
Figure 9:
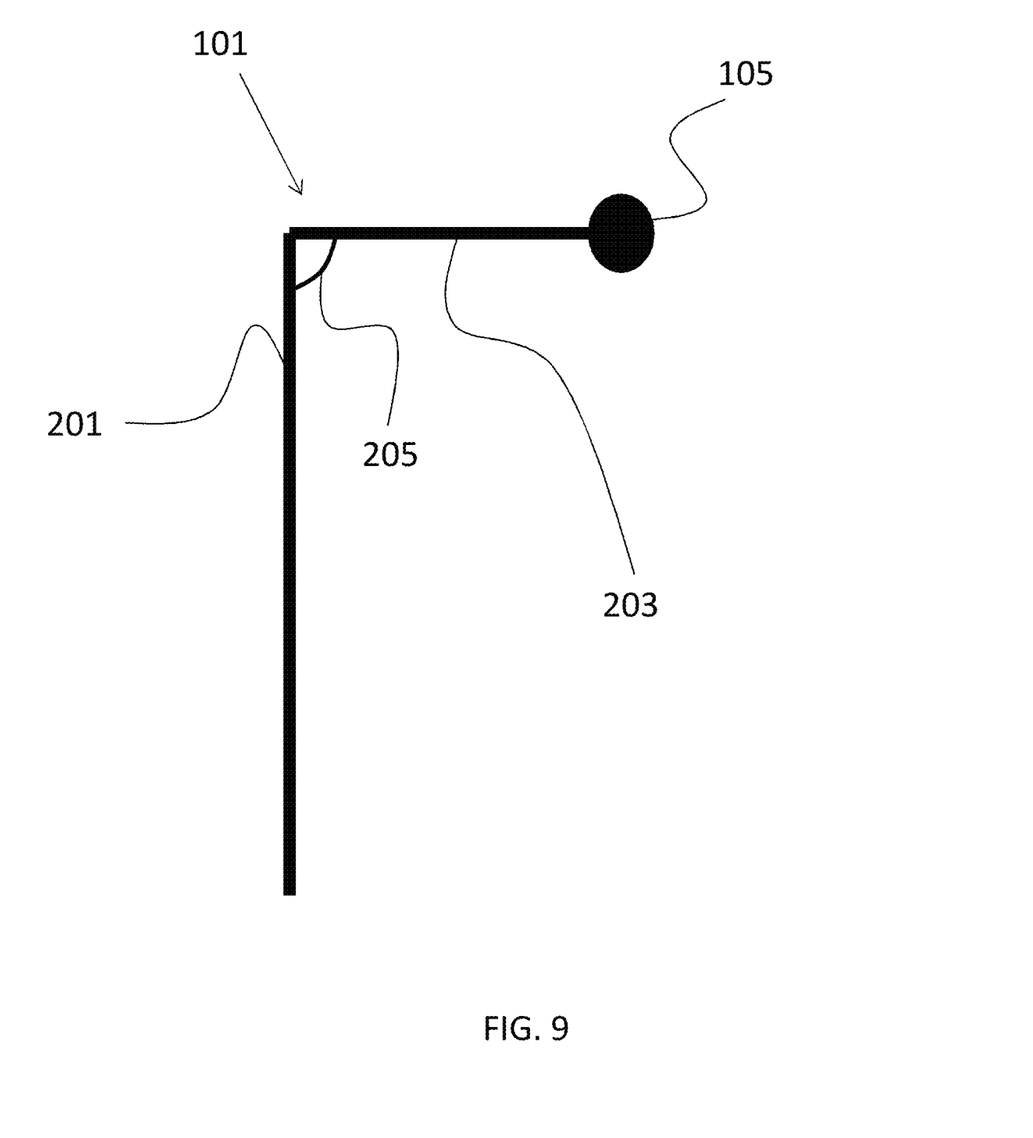
FIG. 9 depicts a mounting or support rail according to certain embodiments.

FIG. 3 illustrates a top view of an embodiment similar to the one shown in FIG. 2. The cargo 113 and mounting rails 101 are in the raised position on top of the vehicle 109 roof. As illustrated in more detail in FIG. 9, the mounting rails 101 are shown to have a parallel portion 201 that is parallel to two frame rails 121 which form part of the frame 103 and are transversely coupled to the vehicle 109 roof (i.e., run across the vehicle 109 roof from side to side or door to door as opposed to running longitudinally, or front to back). The cargo 113 is mounted to this parallel portion 201 of the mounting rail 101 in a manner that allows the mounting rail 101 to rotate with respect to the cargo 113 while being raised or lowered such that the cargo remains in an upright orientation. The cargo 113 may be mounted to the mounting rail 101 using, for example, any of the same mounting methods as described for the rotatable coupling 105. The mounting rail also comprises an angled portion 203 that runs from the parallel portion 201 to the rotatable coupling 105 that mounts the mounting rail 101 to the frame 103. The angled portion 203 is coupled to the parallel portion at angle 205. The mounting rails are secured to the frame in the raised position by a locking mechanism 115. The locking mechanism 115 may comprise, for example, a locking pin which must be removed before the system can be lowered in order to prevent accidental movement of the rack system during operation of the vehicle. The locking mechanism 115 may also include a keyed or combination lock to prevent unauthorized manipulation of the system.

Figure 10:
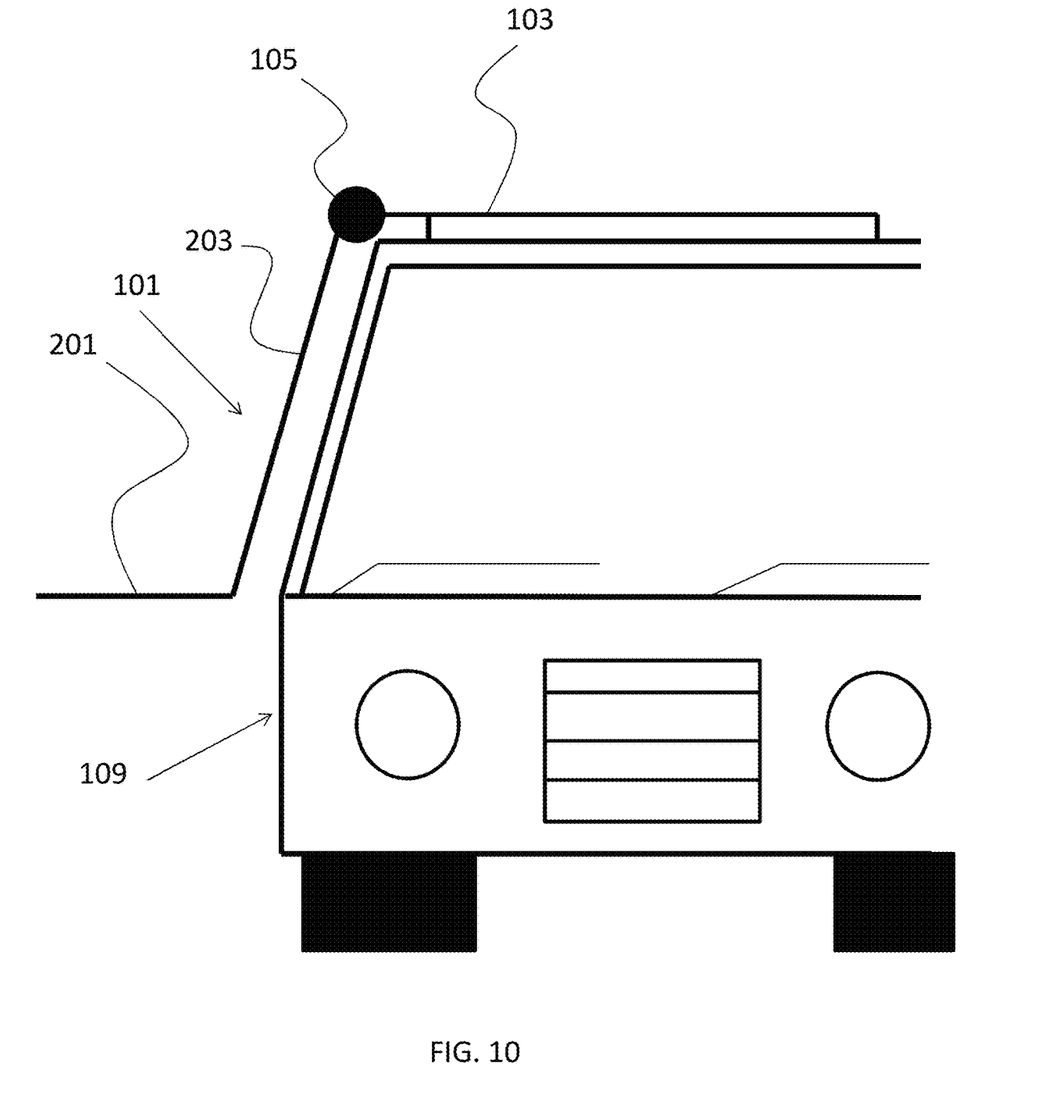
FIG. 10 depicts a front view of a vehicle with a roof rack system according to certain embodiments mounted thereto in the lowered position.

The distance that the cargo 113 and parallel portion 201 of the mounting rail 101 may be lowered with respect to the vehicle 109 roof and the roof mounted frame 103 is defined in part by the length of the angled portion 203 and its angle 205 relative to the parallel portion 201. The angled portion 203 may be at any angle relative to the parallel portion 201 of the mounting rail. In a preferred embodiment the angled portion 203 is substantially at a 90 degree angle to the parallel portion 201. In other embodiments, the angled portion 203 may be at a 45, 50, 55, 60, 65, 70, 75, 80, 85, 95, 100, 105, 110, 115, 120 angle relative to the parallel portion 201. In various embodiments, the angle may be such that it accommodates the angle of a vehicle's side windows as shown in FIG. 10. The angled portion 203 may be a variety of lengths such as 1, 2, 3, 4, 5, 6, or 7 feet depending on factors such as the length of roof, the size and type of the cargo, and the desired lowering distance.

Figure 4:
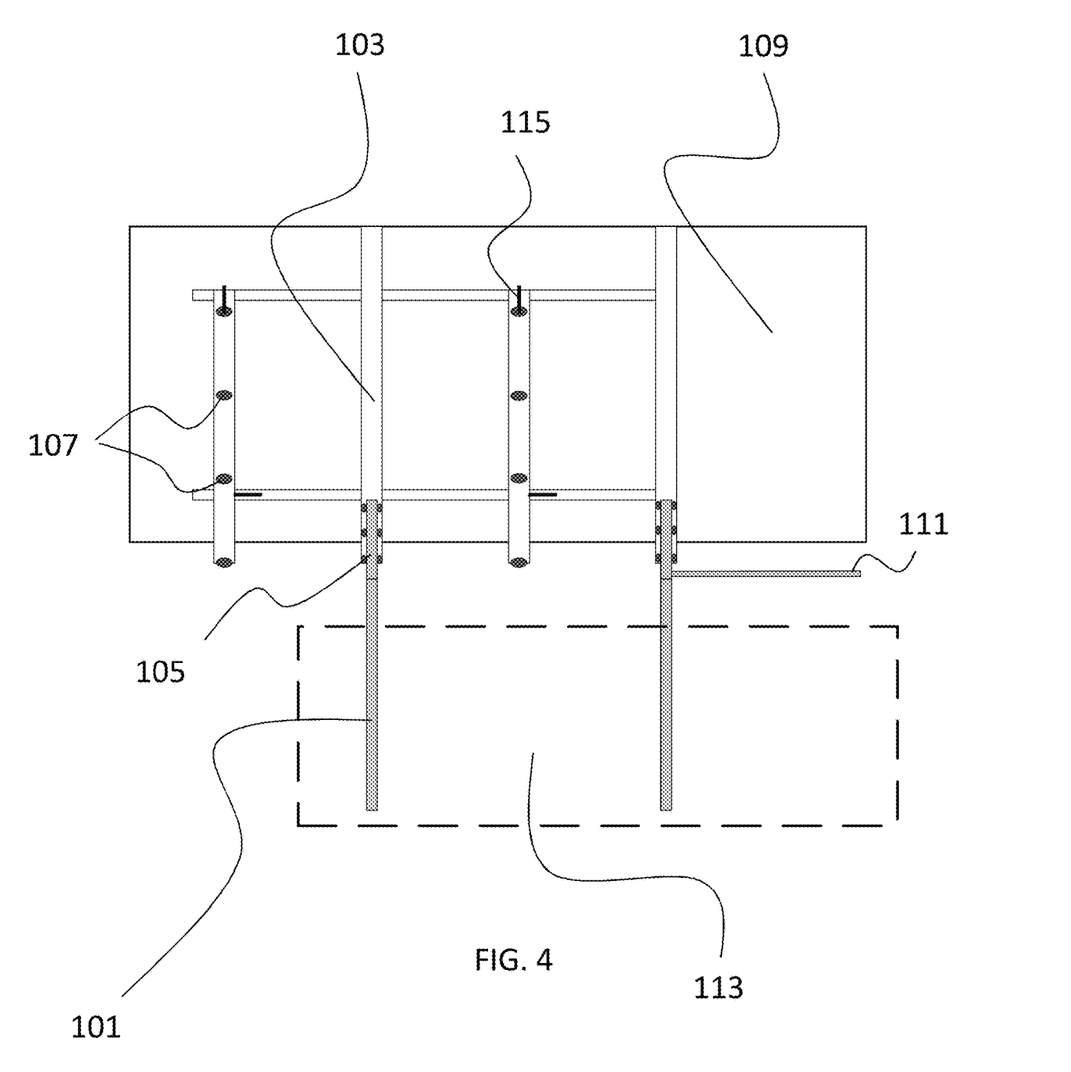
FIG. 4 depicts a top view of a manually operated roof rack system in the lowered position, according to certain embodiments.

FIG. 4 illustrates a top view of an embodiment similar to the one shown in FIG. 1. The cargo 113 and mounting rails 101 are in the lowered position, to the side of the vehicle 109 as the angled portion 203 of the mounting rails 101 are perpendicular to the ground beneath the vehicle 109 so that the parallel portion 201 of the mounting rails 101 are lower than the vehicle roof, by approximately the distance of the angled portion 203 of the mounting rails 101 (given an angle 205 of about 90°). This lower positioning allows a user much easier access to the cargo 113 without requiring the user to climb on the vehicle or to reach above his or her head.

Figure 5:
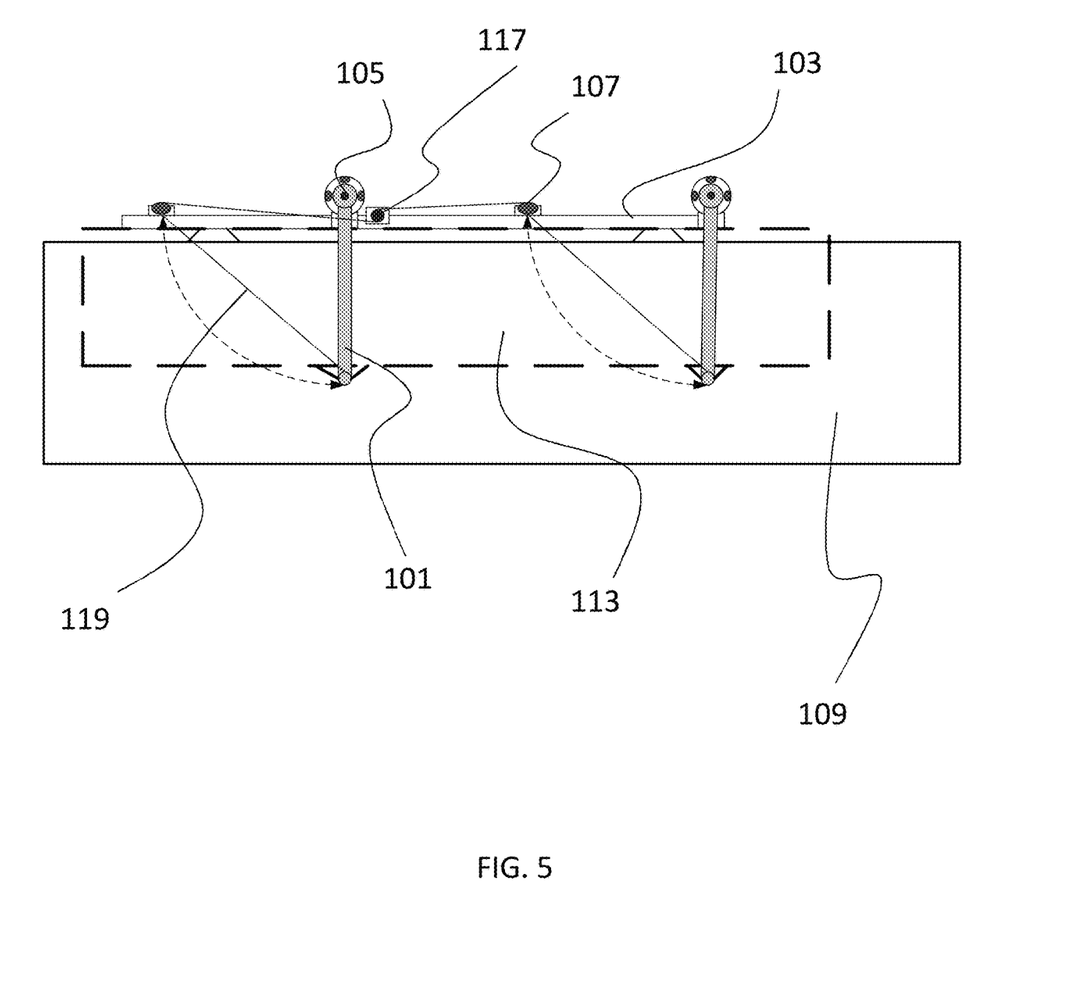
FIG. 5 depicts a side view of a powered roof rack system in the lowered position, according to certain embodiments.

FIG. 5 shows a side view of a powered roof rack system in the lowered position, to the side of a vehicle 109, similar to the manual system shown in FIG. 1. The system comprises two mounting rails 101 which are rotatably mounted to a frame 103 at a rotating coupling 105. Cargo 113, represented as a roof box depicted in broken line, may mount to the mounting rails such that it remains in the same, upright orientation throughout the lowering and raising operations of the roof rack system. The mounting rails 101, and the rotatable coupling 105 are also slideably mounted to the frame 103 using a slideable coupling 107 such that the frame can remain fixed in position, relative to the vehicle 109, while the mounting rails 101 and the cargo 113 mounted thereto may be slid to the side, off of the vehicle roof 109 at which point the cargo 113 and mounting rails 101 may rotate at the rotatable coupling 105 so that the cargo 113 is lowered relative to the ground providing easier access to an individual standing on the ground. The powered system includes a wench 117 which acts on a cable 119 which is, in turn, connected to the parallel portion 201 of the mounting rails 101 through a series of pulleys. The wench 117 and cable 119 may be used to raise the parallel portion 201 of the mounting rails 101 above the roof of the vehicle 109. The wench 117 and cable 119 may also be used to control the lowering of the cargo 113 as gravity pulls it down to the side of the vehicle 109. Other means of powering roof rack systems of the invention include screw drives, gear boxes, and hydraulic or pneumatic rams. Roof rack systems may be powered by hydraulic or pneumatic pumps driven off of a vehicle's engine or may be powered by electric motors, for example, drawing electrical power from a dedicated battery pack or from the vehicle's battery. In certain embodiments, a roof rack system may include photovoltaic cells for charging and/or powering the system.

Figure 6:
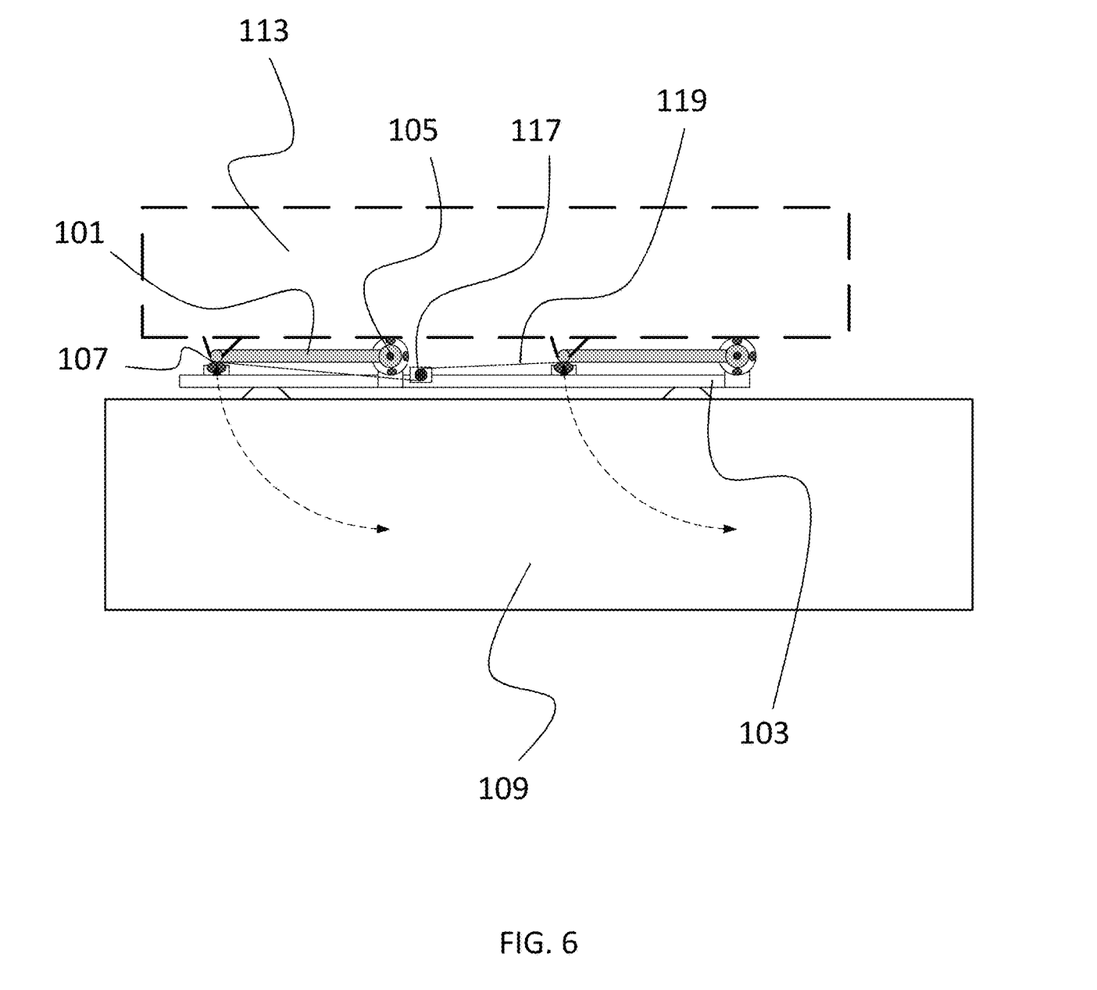
FIG. 6 depicts a side view of a powered roof rack system in the raised position, according to certain embodiments.
Figure 7:
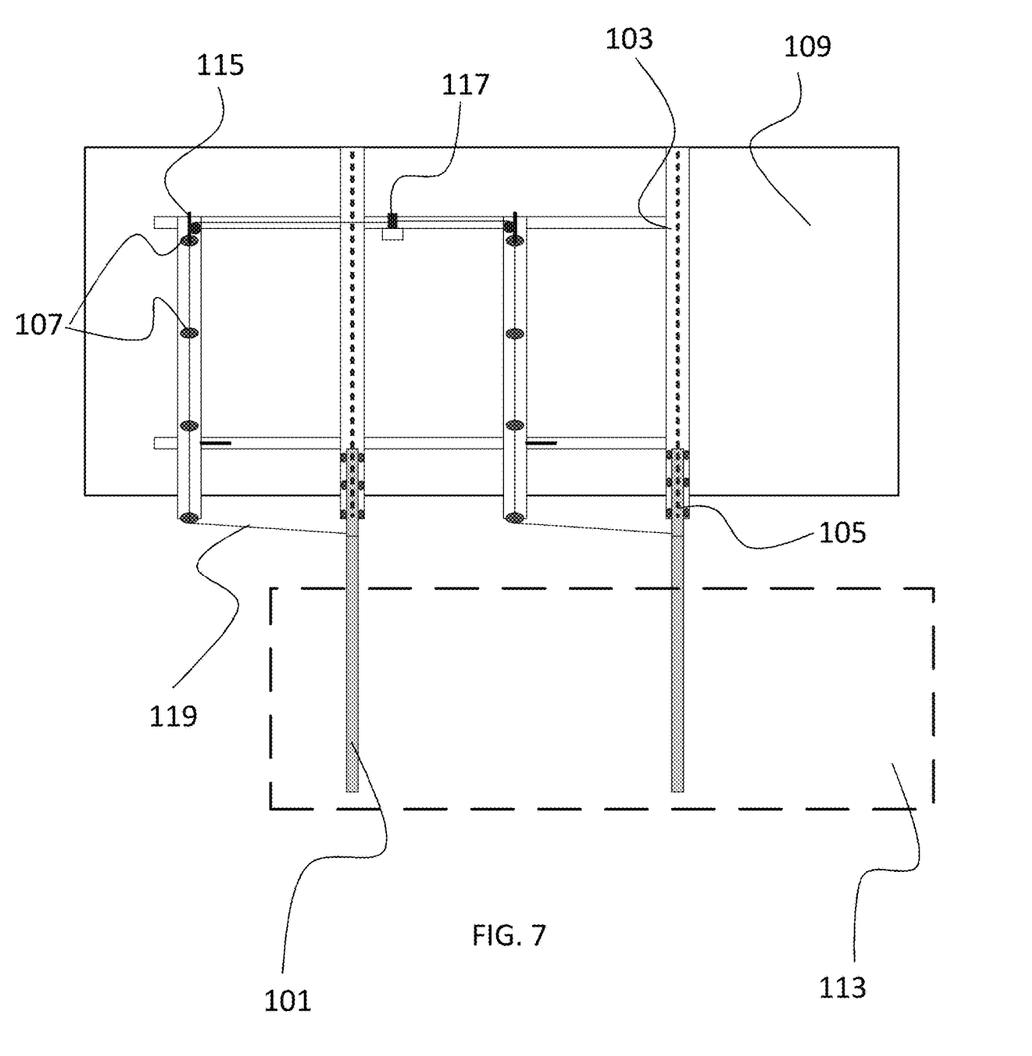
FIG. 7 depicts a top view of a powered roof rack system in the lowered position, according to certain embodiments.
Figure 8:
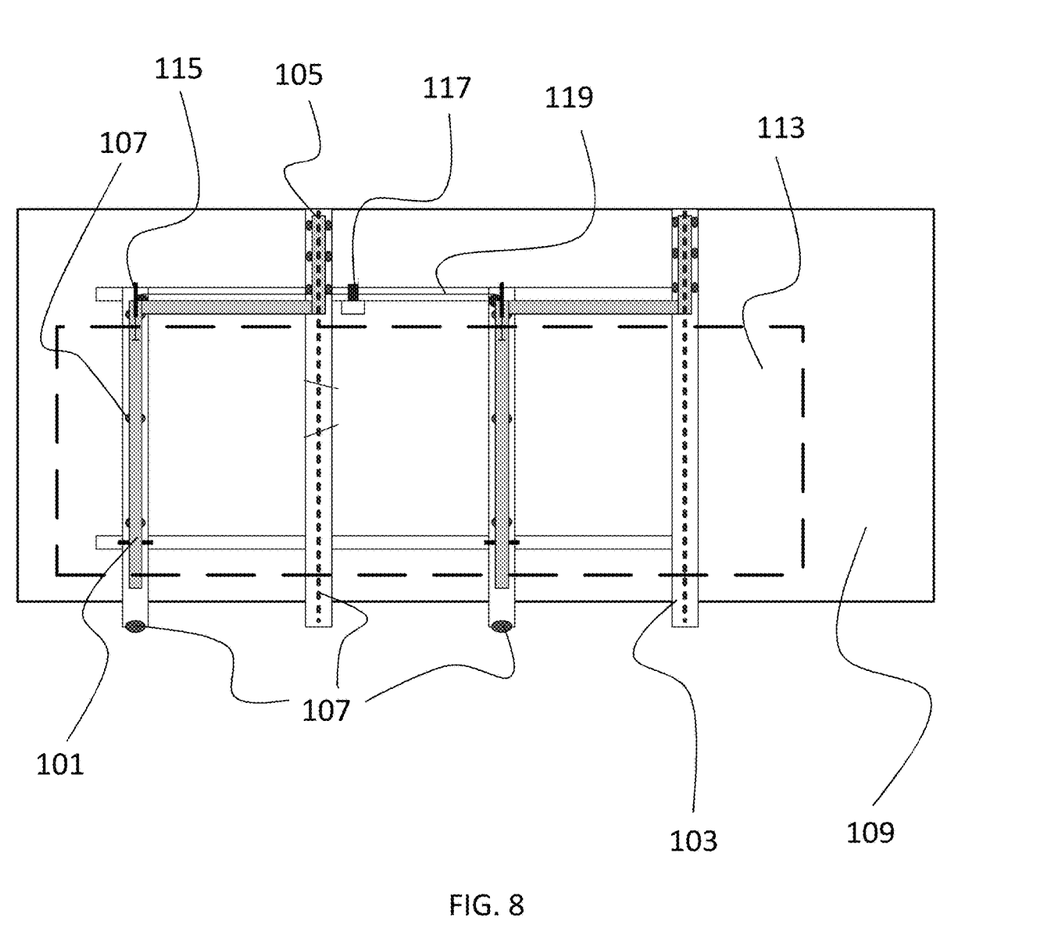
FIG. 8 depicts a top view of a powered roof rack system in the raised position, according to certain embodiments.

FIG. 6 shows a side view of a powered roof rack system as shown in FIG. 5 in the raised position. FIG. 7 shows a top view of a powered roof rack system (lowered position) as shown in FIG. 5. The cargo 113 has been slid to the side, off of the vehicle roof 109 along with the mounting rails 101 which have then been rotated down at the rotatable coupling 105 to lower the cargo relative to the ground. FIG. 8 shows a top view of a powered roof rack system (raised position) as shown in FIG. 5 with the cargo 113 and mounting rails 101 supported on top of the vehicle 109 roof.

Figure 11:
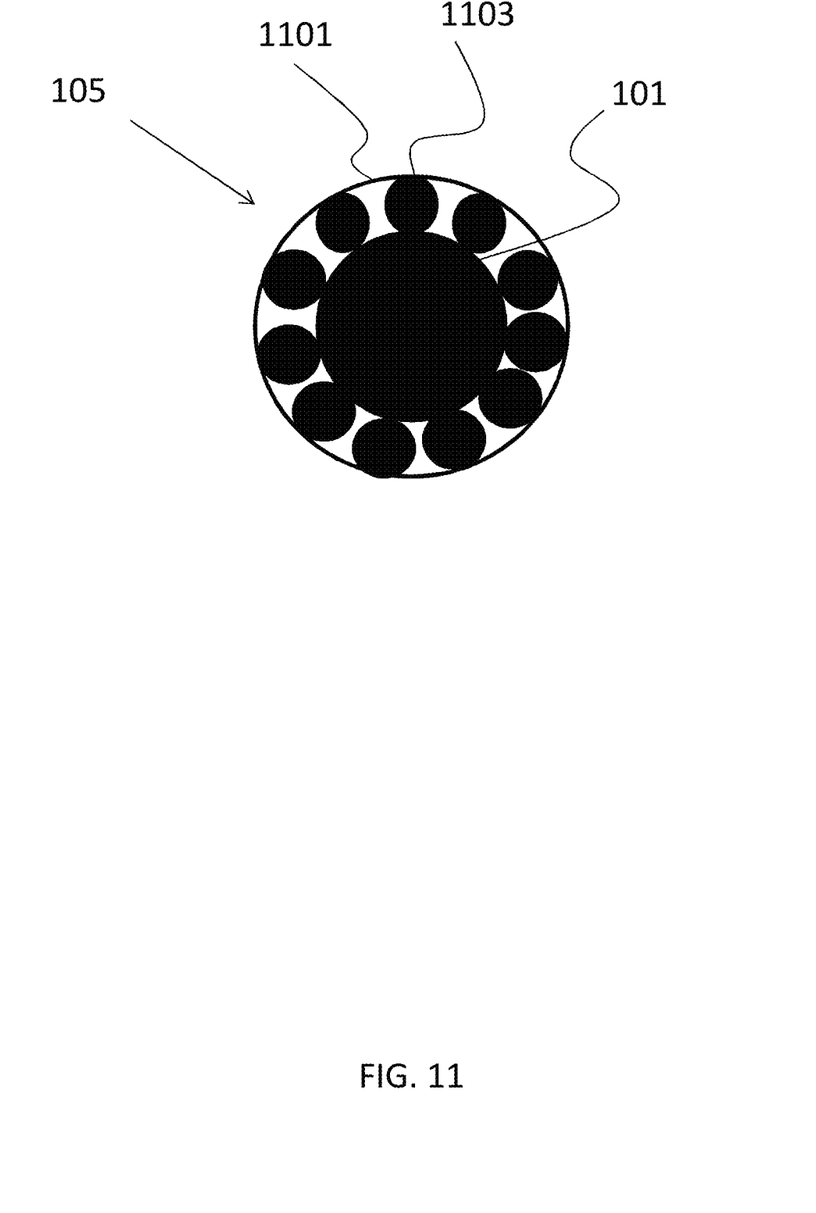
FIG. 11 depicts an exemplary rotatable coupling.

Rotatable couplings 105 may include captured ball bearings 1103 in a ring 1101 through which the mounting rail 101 is inserted to thereby allow the mounting rail 101 to slide in and out of the rotatable coupling 105 as well as rotate therein. The ring 1101 may be mounted to the frame 103 and thereby fixed in position relative to the roof. An exemplary rotatable coupling is shown in FIG. 11. Rotatable couplings 105 and slideable couplings 107 may comprise any material that allows for reduced friction between two surfaces, whether through properties inherent to the material itself in a static coupling (e.g., a Teflon coated or nylon pad as a slideable coupling) through structural properties of a dynamic coupling (e.g., needle or ball bearings). In various embodiments, roof rack systems of the invention may be constructed of metals such as stainless steel, chrome-moly or other alloys. In order to reduce weight, frame materials may include aluminum, titanium, plastics, composites, carbon fiber or other lightweight materials. Rotatable couplings of any of the above types may also be used to couple the cargo or item-specific rack system to the mounting rails.

In certain embodiments, powered roof racks may include a remote control in wired or wireless communication with the motor or other means of powered operation. In certain embodiments, the rack motor may be operable via a mobile device such as a smart phone via a program or application.

The mounting rails 101 may be round, square, teardrop, or other cross-sectional shapes including combinations thereof (e.g., a round portion where the mounting rail 101 interacts with the rotatable coupling 105 and a square or teardrop shape where cargo or other items are mounted to the mounting rail). The mounting rails 101 may include two or more parallel bars such that an upper bar provides a mount for cargo while the lower bar provides a smooth surface at the interface of the mounting rail 101 and the slideable coupling 107. Bike, kayak, ski, ladder, or other item specific rack systems such as available from Yakima Products Inc. (Beaverton, Oreg.) and the Thule Group (Malmo Municipality, Sweden) may be used in conjunction with the rack systems of the invention to secure specific types of cargo by mounting said cargo-specific rack systems to the mounting rails 101 of the invention.

Powered and non-powered rack systems of the invention may include dampeners, springs, or other assistance mechanisms to slow or control the sliding and rotating motions of the rack system and/or to reduce the effort required by the user to operate the system. For example, instead of a winch and cable used to control rotation, a spring may be provided between a fixed point on the roof rack frame and the mounting rail in such a manner as to resist the downward rotation of the mounting rails naturally induced through gravity. Accordingly, the apparent weight of the apparatus to a user could be greatly reduced. Spring tension or resistance force may be tailored to the specific anticipated loads to be carried such that the system is able to still lower light loads or unburdened mounting rails for initial loading.

In certain embodiments one or more springs may be coupled to one or both of the mounting rails by, for example, gears or cables to provide assistance in lifting the rails from a lowered position to roof-height. The assistive lift springs or other mechanisms can be enclosed in a housing to protect components and prevent injury to users. An exemplary assistive lift mechanism using springs is shown in FIGS. 12 and 13.

Figure 12:
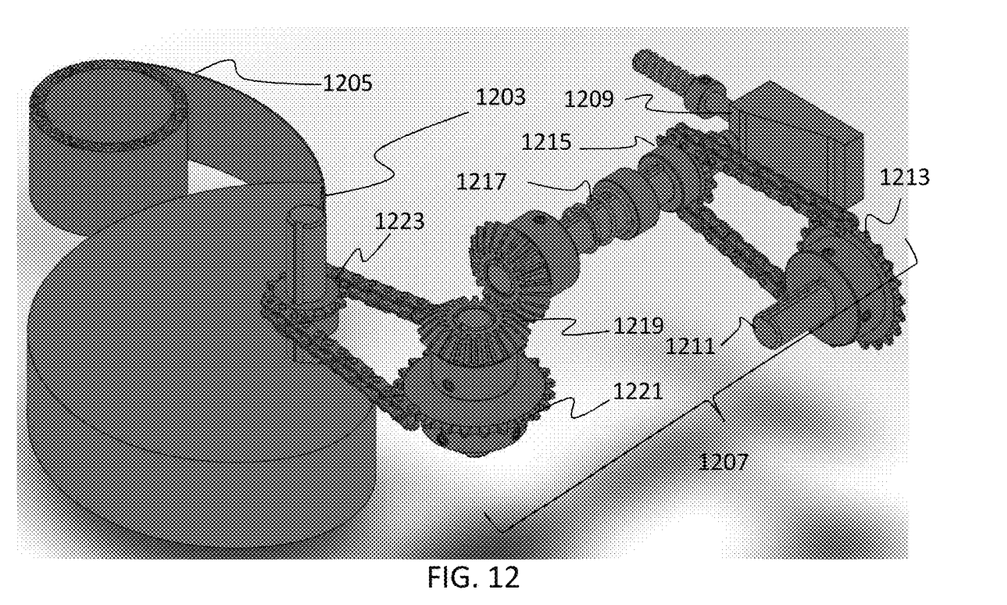
FIG. 12 depicts an exemplary spring-assist system.
Figure 13:
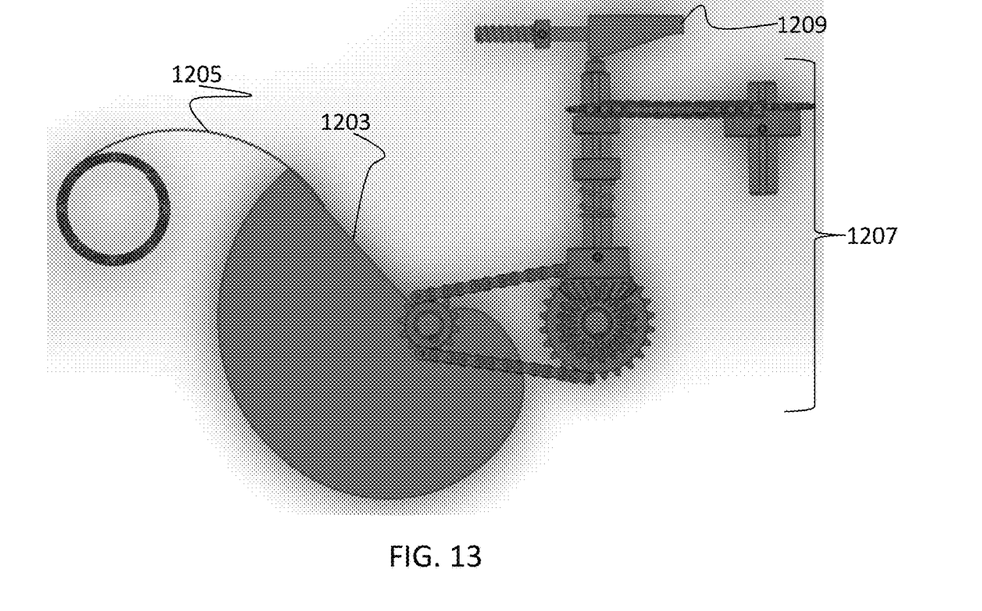
FIG. 13 depicts a top view of an exemplary spring-assist system.

FIG. 12 shows a spring-assist system that supports the mounting rails when loaded. Such a system can operate with or without auxiliary motor support and, in preferred embodiments can support 75 or more lbs. without additional support systems (e.g., motors or hydraulic or pneumatic devices) using passive elements. Depending on the current angle of the swing arm, the mechanism shown in FIG. 12 can provide a balancing torque on the rotating portion of the mounting rail such that a user is required to support at 25 lbs. or less while lifting and lowering cargo between roof-height and fully-lowered loading height at the side of the vehicle.

In a preferred embodiment, as shown in FIG. 12, the lift system comprises a constant-force spring 1205, a radial cam 1203, and an optional linear cam 1209. As shown in FIG. 12, the radial cam 1203 is attached to a constant force spring 1205. Rotational movement of the mounting rail 1211 at the rotatable coupling can be transferred to the radial cam 1203 via a translational mechanism 1207 including, for example bevel gears, standard gears, cables, shafts, sprockets, and/or chains as known in the art to change the direction, type, and/or rate of movement. In the embodiment depicted in FIG. 12, a sprocket 1213 on the rotating mounting rail 1211 turns a smaller sprocket 1215 on a secondary shaft 1217 via a chain to increase the rotational force and speed of the secondary shaft relative to the mounting rail. The rotation of the secondary shaft is turned 90° by a bevel gear 1219 coupled to another sprocket 1221 which, in turn, turns the radial cam 1203 via a radial-cam-coupled sprocket 1223. The ratio of teeth in the various sprockets can be varied to reduce or increase rotational speed through the translational mechanism 1207.

In the embodiment shown in FIG. 12, as the mounting rail 1211 rotates, the translational mechanism 1207 rotates the radial cam 1203 at a 3.7:1 ratio. Such a configuration serves to multiply the resistive force of the constant-force spring 1205 coupled to the radial cam 1203 by the time it acts on the mounting rail 1211. The constant-force spring 1205 is coupled to the radial cam 1203 such that rotation of the radial cam 1203 in response to lowering of the mounting rails 1211 is resisted by the tension in constant-force spring 1205.

The force of the constant-force spring 1205 is applied at various distances from the center cam shaft of the radial cam 1203 as the system rotates which varies the amount of torque balancing of the system. In preferred embodiments the resistive force is provided by a constant-force spring 1205, as shown in FIG. 12. Constant force springs are springs for which the force they exert over their range of motion is relatively constant. Constant force springs may be constructed from rolled ribbons of, for example, spring steel as depicted in FIG. 12.

In certain embodiments, systems may use a mechanism to engage and disengage the assistive force. Such an arrangement can help accommodate raising and lowering of both loaded and un-loaded mounting rails. For example, a constantly-applied assistive force would need significant downward force to lower the mounting rails against, for example, a spring force resisting that movement. When the system is empty, it would be undesirable for the radial cams to provide the balancing torque required when the system is loaded to maximum capacity. Leaving the radial cams engaged would make it difficult for the user to bring and empty platform down from a fully raised position. A system providing 75 lbs. of assistive force would require a 75 lb. force to pull down when unloaded. It could also cause the system to rise suddenly after the platform was unloaded and unlocked from its lowered position. Accordingly, a mechanism may be incorporated to selectively engage or disengage the assistive force to alleviate that potential issue. An exemplary mechanism is shown in FIG. 12. The secondary shaft 1217 is slidable by engagement with an angled linear cam 1209. Movement of the linear cam 1209 slides the secondary shaft to engage or disengage the bevel gear 1219 thereby coupling or uncoupling the mounting rail 1211 from the resistive force of the constant-force spring 1205. FIG. 13 shows a top-view of the system depicted in FIG. 12.

In various embodiments, a radial cam may be employed to adjust the distance that a force is applied from the center of the radial cam shaft, thereby altering the torque on the shaft without altering the applied force of the spring. Applying a force at a distance produces a torque which is then applied to the rotating mounting rail in a direction opposite to the torque being applied by the loading on the overall system. As the swing arm drops from maximum height to a fully lowered position, the amount of torque applied to the mounting rail decreases, thus the balancing torque must also be decreased. Reducing the radius of the cam in relation to the current rotation of the mounting rail, the corresponding balancing torque can also be reduced.

To determine the required geometry of the radial cam, one can calculate the amount of torque balancing required at every angle of rotation of the mounting rail from 0 to 90 degrees. As the cam is rotated, the tangent angle between the position where the spring is fixed to the housing and where the spring is acting on the cam changes. A change in application position means that the proper balancing torque is no longer being applied for the current rotation angle of the mounting rail. The cam geometry can be calculated and corrected such that the calculated desired radius at a given mounting rail rotation is applied at the proper tangent point.

The constant-force spring applies the same amount of force independent of the length of spring that is unwound. In a preferred embodiment, the spring applies a 40.9 lb. load and can be unraveled up to 60 inches. The spring can wrap around the radial cam as it is rotated, allowing the system to be operated with the spring engaged and disengaged multiple times without requiring re-winding of the spring. At some point, once the constant-force spring is completely wound, the constant-force spring may need to be energized before it can provide assistive force during lifting of a loaded mounting rail. The spring can be energized (e.g., un-wound) by, for example, pulling down on the unloaded mounting rails while coupled to the spring or through a dedicated device such as a manual or motor-driven lever or crank.

INCORPORATION BY REFERENCE

References and citations to other documents, such as patents, patent applications, patent publications, journals, books, papers, or web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A roof mounted rack system comprising:
   a frame configured to mount to a vehicle roof, said frame comprising:
      a frame rail configured to be transversely mounted to the vehicle roof;
      a mounting rail, comprising a parallel portion substantially parallel to the frame rail, said mounting rail being slidably and rotatably coupled to the frame rail such that, when the frame is mounted to the vehicle roof, the mounting rail is operable to:
         slide, relative to the frame rail, in a transverse direction so that the parallel portion of the mounting rail extends into a space to the side of the vehicle roof, and
         rotate, relative to the frame rail, such that the parallel portion of the mounting rail is lowered below a plane defined by the vehicle roof wherein the parallel portion of the mounting rail remains substantially parallel to the frame rail throughout the rotation,
   wherein the mounting rail comprises an angled portion substantially perpendicular to the parallel portion and the frame rail, wherein the angled portion is slideably and rotatably coupled to the frame rail by a rotatable coupling and a length of the angled portion corresponds to a distance by which the parallel portion of the mounting rail can be lowered below the plane defined by the vehicle roof.

2. The roof mounted rack system of claim 1, further comprising a powered winch and cable assembly operable to perform the sliding and rotating steps.

3. The roof mounted rack system of claim 2, further comprising a remote control operable to control the powered winch.

4. The roof mounted rack system of claim 3, wherein the remote control is in wireless communication with the powered winch.

5. The roof mounted rack system of claim 1, further comprising a dampener configured to dampen the rotation of the mounting rail relative to the frame rail.

6. The roof mounted rack system of claim 1, further comprising a spring configured to resist the rotation of the mounting rail relative to the frame rail.

7. The roof mounted rack system of claim 1, wherein the rotatable coupling comprises ball bearings.

8. The roof mounted rack system of claim 1, wherein the parallel portion is configured to receive cargo.

9. The roof mounted rack system of claim 8, further comprising a cargo-specific mount coupled to the parallel portion.

10. The roof mounted rack system of claim 9, wherein the cargo-specific mount is configured to receive a bicycle, a kayak, a surfboard, a ski, a ladder, a canoe, a paddleboard, or a snowboard.

11. The roof mounted rack system of claim 1, further comprising a locking mechanism configured to prevent the mounting rail from sliding or rotating when in a locked position.

12. The roof mounted rack system of claim 1, further comprising a spring-assisted lifting system operable to resist rotation of the mounting rail relative to the frame rail as the parallel portion of the mounting rail is lowered below the plane defined by the vehicle roof.

13. The roof mounted rack system of claim 12, wherein the spring-assisted lifting system comprises a constant-force spring coupled to the mounting rail by a radial cam operable to transfer progressively lesser resistive force from the constant-force spring to the mounting rail as the parallel portion of the mounting rail is lowered below the plane defined by the vehicle roof.

14. The roof rack of claim 12, further comprising a disengagement system operable to disengage the mounting rail from the spring-assisted lifting system.

* * * * *